United States Patent [19]

Fujiki et al.

[11] Patent Number: 4,634,627
[45] Date of Patent: Jan. 6, 1987

[54] MAGNETIC RECORDING MEDIUM COMPRISING A SURFACE-TREATED ABRASIVE

[75] Inventors: Kuniharu Fujiki; Hiroshi Togashi, both of Mito, Japan

[73] Assignee: Victor Company of Japan, Limited, Japan

[21] Appl. No.: 796,521

[22] Filed: Nov. 8, 1985

[30] Foreign Application Priority Data

Nov. 12, 1984 [JP] Japan .................................. 59-236599

[51] Int. Cl.$^4$ ............................................. G11B 3/70
[52] U.S. Cl. ................................... 428/323; 360/134; 360/135; 360/136; 427/128; 428/328; 428/329; 428/694; 428/900; 428/425.9; 428/407
[58] Field of Search ............... 428/694, 697, 405, 407, 428/900, 425.9, 328, 329, 323; 427/131, 128; 360/134-136

[56] References Cited

U.S. PATENT DOCUMENTS 4,420,408 12/1983 Kajimoto ........................ 428/425.9
4,501,795  2/1985 Takeuchi ........................... 428/694
4,584,243  4/1986 Kadokura .......................... 428/694

FOREIGN PATENT DOCUMENTS 59-154646 9/1984 Japan .

Primary Examiner—Ellis P. Robinson
Attorney, Agent, or Firm—Lowe, Price, LeBlanc, Becker & Shur

[57] ABSTRACT

A magnetic recording medium comprising a nonmagnetic support, and a magnetic recording layer formed on said support. The magnetic recording layer comprises a magnetic powder and an abrasive powder dispersed in a resin binder. The abrasive powder has a coating of an isocyanate compound having at least two isocyanate groups in one molecule thereof and is used in an amount of from 0.5 to 20 parts by weight per 100 parts by weight of the magnetic powder.

6 Claims, 1 Drawing Figure

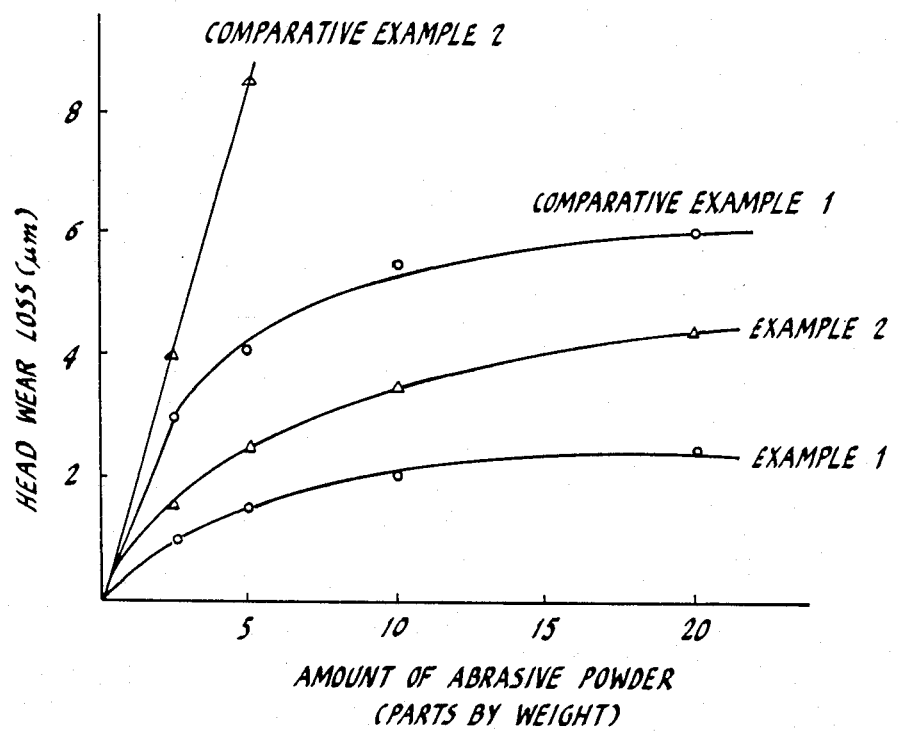

MAGNETIC RECORDING MEDIUM COMPRISING A SURFACE-TREATED ABRASIVE

BACKGROUND OF THE INVENTION

1. Field of the Invention

This invention relates to magnetic recording mediums such as, for example, magnetic tapes, floppy disks, hard disks and allied articles.

2. Description of the Prior Art

In order to improve a wear resistance of magnetic recording mediums, it is the usual practice to add nonmagnetic oxide powders having high hardness such as, for example, aluminum oxide or chromium oxide powder, to a magnetic layer of the medium. However, when such a nonmagnetic oxide powder is added to a magnetic paint, applied onto a nonmagnetic substrate and dried, the resulting magnetic layer has relatively poor surface properties, so that electromagnetic conversion characteristics become poor and particularly, noises will be produced when the medium is reproduced. Presumably, this is because the oxide powder having high surface activity undergoes a reaction with a binder contained in the paint. In an extreme case, the magnetic paint comprising the oxide powder may be gelled during preparation thereof depending on the type of binder. This disenables the magnetic paint to be coated on a base.

In order to overcome the above problem, there has been proposed in Japanese Laid-open Patent Application No. 59-154646 a magnetic recording medium in which a specific type of abrasive powder is treated. More particularly, an abrasive powder such as an aluminum oxide, chromium oxide or titanium oxide powder, is treated on the surface thereof with a compound having one isocyanate group in the molecule thereof. This surface-treated powder is added to a magnetic paint. The surface treatment with one isocyanate group-bearing compound can improve the surface properties of the magnetic layer and can prevent gelation of the magnetic paint as will be experienced in prior art cases. However, the recording medium using an oxide powder which has a compound with one isocyanate group in the molecule thereof coated on the surface thereof, is disadvantageous in that the magnetic head brought in contact with the medium becomes contaminated considerably within a short time of the contact.

SUMMARY OF THE INVENTION

It is an object of the invention to provide a magnetic recording medium which comprises a magnetic recording layer dispersing an abrasive powder which is coated with a specific type of isocyanate compound whereby the medium has a good and improved wear resistance even when subjected to still reproduction operation.

It is another object of the invention to provide a magnetic recording medium whose magnetic recording layer has good surface properties while uniformly dispersing an abrasive powder whereby good electromagnetic conversion characteristics can be achieved.

It is a further object of the invention to provide a magnetic recording medium which does rarely cause the magnetic recording head to be contaminated therewith.

According to the invention, there is provided a magnetic recording medium which comprises a nonmagnetic support and a magnetic recording layer formed on the support. The present invention is characterized in that the magnetic recording layer should comprise an abrasive powder dispersed in a binder and the abrasive powder is surface-treated with a compound having at least two isocyanate groups in one molecule thereof. When using the thus surface-treated powder, the above objects can be fully attained.

BRIEF DESCRIPTION OF THE INVENTION

A sole FIGURE is a graph showing a wear loss of a magnetic head in relation to variation in amount of abrasive powders.

DETAILED DESCRIPTION AND EMBODIMENTS OF THE INVENTION

The magnetic recording medium of the invention comprises, as described above, a nonmagnetic support and a magnetic recording layer formed on at least one side of the support. The present invention is characterized by an abrasive powder uniformly dispersed throughout the magnetic recording layer. The abrasive powders used in the present invention are, for example, nonmagnetic oxide powders such as, for example, powders of aluminum oxide, chromium oxide, titanium monoxide, titanium dioxide, alpha-$Fe_2O_3$ and the like. Other oxide powders ordinarily used for these purposes may also be used without limitation. Preferably, chromium oxide, i.e. $Cr_2O_3$, is used. This is because chromium oxide is so hard that when it is used as it is, a magnetic head is more likely to be worn. In addition, $Cr_2O_3$ is rather poor in dispersability and is also relatively poor in compatibility with various binder resins. When such chromium oxide powder is coated with an isocyanate compound as used in the present invention, the above drawbacks can be almost completely overcome and the wear resistance of the magnetic layer can be improved. Aside from the oxide powders, nitride powder may be also used, including, for example, titanium nitride, silicon nitride and the like. In general, these powders have an average size of from 0.2 to 1 $\mu$m.

These abrasive powders are treated on the surface thereof with compounds having at least two isocyanate groups in the molecule thereof. Useful isocyanate compounds may be various isocyanate compounds having at least two isocyanate groups in the molecule thereof. Such compounds are, for example, adducts of isocyanate compounds such as aliphatic diisocyanates, alicyclic diisocyanates and aromatic diisocyanates, e.g. diphenylmethane diisocyanate, biphenyl diisocyanate, naphthalene diisocyanate, triphenylmethane diisocyanate and the like, and di or polyhydric alcohols such as ethylene glycol, butylene glycol, hexamethylene glycol, trimethylol propane, neopentyl alcohol and the like. Typical and preferable isocyanate compounds are of the following formulae:

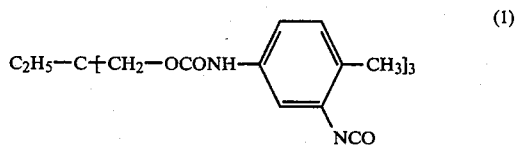

(1)

(Coronate L, by Nippon Polyurethane Co., Ltd.)

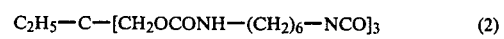

(2)

-continued

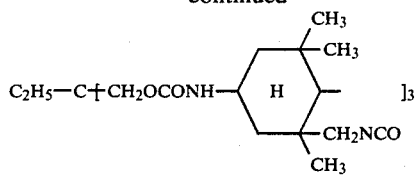

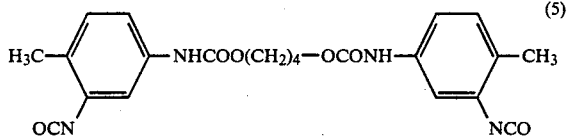

These isocyanate compounds may be used singly or in combination, if desired. For the surface treatment, an isocyanate compound and an abrasive powder are placed in a solvent for the isocyanate compound and mixed under agitation at room or elevated temperatures for a time sufficient for complete mixing. Subsequently, the abrasive powder is collected by suitable means to remove excess isocyanate compound therefrom. The thus collected powder is dried at a temperature at which evaporation of the solvent is facilitated, e.g. from 30° to 80° C. The powder may be further heated, if necessary, by which the treated isocyanate compound will be firmly adhered to the individual particles. The isocyanate compound is generally applied onto the abrasive powder in an amount of from 3 to 20 wt% of the abrasive powder on the dry basis. In practice, the surface-treated abrasive powder is mixed with a binder and a magnetic powder in an amount of from 0.5 to 20 parts by weight per 100 parts by weight of the magnetic powder.

The binders may be any known thermoplastic resins, thermosetting resins and mixtures thereof. Typical thermoplastic resins include; vinyl chloride copolymers such as vinyl chloride-vinyl acetate copolymers, vinyl chloride-vinylidene chloride copolymers, vinyl chloride-acrylonitrile copolymers, vinyl chloride-vinyl acetate-vinyl alcohol terpolymers and the like; other copolymers such a acrylic ester-vinylidene chloride copolymers, acrylic ester-styrene copolymers, methacrylic ester-acrylonitrile copolymers, methacrylic ester-vinylidene chloride copolymers and the like; and urethane elastomers, polyvinyl fluoride resins, cellulose derivatives such as cellulose acetate, cellulose propionate, nitro cellulose and the like, amino resins and various other synthetic resins. Examples of thermosetting resins include phenolic resins, epoxy resins, polyurethane resins, urea resins, melamine resins, alkyd resins, silicone resins, acrylic resins, isocyanate prepolymers and other various thermosetting resins.

The magnetic powders used in the present invention may be any magnetic metal powders ordinarily used in this art and include, for example, ferromagnetic iron oxides such as gamma-$Fe_2O_3$ and $Fe_3O_4$ with or without being deposited with Co, Ni, Mn and the like, ferromagnetic metals such as Co, Ni, Fe and alloys thereof such as Fe-Co, Fe-Ni, Co-Ni, Fe-Co-Ni, and other ferromagnetic materials such as $CrO_2$, barium ferrite and the like. As is well known in the art, these magnetic powders are generally used in an amount of 20 to 80 parts by weight, preferably from 30 to 60 parts by weight, per 100 parts by weight of the binder.

Aside from the above essential ingredients, other various additives such as, for example, dispersing agents, lubricants, other abrasive powders, antistatic agents and the like, may be added to the magnetic paint mixture.

For the manufacture of the magnetic recording medium, a magnetic powder and a surface-treated abrasive powder are dispersed in a resin binder and a solvent for the binder by the use of a suitable mixing or kneading means. The resulting magnetic paint is coated onto a non-magnetic support at least on one side thereof, and is dried and cured under conditions of a temperature of, for example, 40° to 80° C. for a time sufficient for the curing. The coating may be effected by any known techniques such as spin coating, air knife coating, blade coating, dip coating, various roll coatings, spray coating and the like. The magnetic recording layer is generally coated in the range of from 0.5 to 10 μm.

Nonmagnetic supports may be disks, films, foils or sheets of a variety of materials including, for example, synthetic or semi-synthetic resins such as polyesters, polyimides, polyphenylene sulfides, polyolefins, cellulose derivatives and the like, metals such as aluminum, magnesium, copper and the like, glasses and ceramics.

The present invention is more particularly described by way of examples, in which parts are by weight.

EXAMPLE 1

A Coronate L (available from Nippon Polyurethane Ind. Co., Ltd.), which is a low molecular weight isocyanate compound having three isocyanate groups in one molecule thereof, was dissolved in toluene, to which an aluminum oxide ($Al_2O_3$) powder having an average size of about 0.5 μm was added. The mixture was agitated at 40° C. for 1 hour and then filtered and washed with toluene to remove the excess isocyanate compound from the oxide powder. Thereafter, the powder was dried at 60° C. for 24 hours to obtain the aluminum oxide powder surface-treated with the isocyanate compound in an amount of about 6 to 8 wt% based on the aluminum oxide powder.

One hundred parts by weight of Co-gamma-$Fe_2O_3$ magnetic powder, 20 parts by weight of a mixture of a vinyl chloride-vinyl alcohol copolymer and a polyurethane elastomer, 1 part by weight of lecithin, 5 parts by weight of carbon black, 300 parts by weight of a mixed solvent of equal amounts of toluene, methyl ethyl ketone and methyl isobutyl ketone, 1 part by weight of n-butyl stearate, and different amounts but not larger than 20 parts by weight of the surface-treated aluminum oxide powder were placed in a sand mill and dispersed for 20 hours. To the mixture was added 5 parts by weight of polyisocyanate (Coronate L), thereby obtaining a magnetic paint. The thus obtained paint was applied onto a 14.5 μm thick polyester film, dried and calendered, followed by curing at a temperature of 65° C. for 48 hours. The resulting film was slit into ½ inch wide magnetic tapes for use in a video tape recorder.

EXAMPLE 2

The general procedure of Example 1 was repeated except that there was used, instead of the surface-treated aluminum oxide powder, chromium oxide powder ($Cr_2O_3$) which had been treated with the isocyanate compound used in Example 1, thereby obtaining magnetic recording tapes for a video tape recorder.

COMPARATIVE EXAMPLE 1

The general procedure of Example 1 was repeated except that non-treated aluminum oxide powder was used instead of the surface-treated aluminum oxide powder, thereby obtaining magnetic recording tapes.

COMPARATIVE EXAMPLE 2

The general procedure of Example 2 was repeated except that non-treated chromium oxide was used instead of the surface-treated chromium oxide powder, thereby obtaining magnetic recording tapes.

COMPARATIVE EXAMPLE 3

The general procedure of Example 1 was repeated except that aluminum oxide powder was surface-treated with an isocyanate compound having one isocyanate group in one molecule thereof, i.e. $C_{16}H_{31}$—NCO, thereby obtaining magnetic recording tapes.

COMPARATIVE EXAMPLE 4

The general procedure of Example 2 was repeated except that chromium oxide powder was surface-treated with $C_{16}H_{31}$—NCO, thereby obtaining magnetic recording tapes.

The magnetic tapes obtained in the above examples and comparative examples using 5 parts by weight of each abrasive powder, were subjected to tests to determine a wear loss of a magnetic head and a degree of contamination of the magnetic head under conditions of a temperature of 40° C., a relative humidity of 80% and an operation time of 200 hours, a continuous still reproduction operation time at a temperature of −10° C. for facilitating the test. The results are shown in Table below.

TABLE

| | Wear Loss of Magnetic Head (μm) | Contamination of Magnetic Head | Still Reproduction Time |
|---|---|---|---|
| Example | | | |
| 1 | 1.5 | slight | over 90 minutes |
| 2 | 2.5 | very slight | over 90 minutes |
| Comparative Example | | | |
| 1 | 4.0 | considerable | over 90 minutes |
| 2 | 8.5 | slight | over 90 minutes |
| 3 | 2.0 | considerable | over 90 minutes |
| 4 | 3.5 | considerable | over 90 minutes |

As will be seen from the above results, the magnetic recording medium using the abrasive powder which was surface-treated with the compound having one isocyanate group is better with respect to the magnetic head wear loss than the magnetic recording mediums using the non-treated oxide powders, but is worse with respect to the contamination of the magnetic head. In contrast, the magnetic recording mediums of the invention in which the abrasive powders treated with the isocyanate compound having three isocyanate groups in one molecule were used, do rarely cause the contamination of the magnetic head, leading to good recording and reproducing characteristics. Moreover, the head wear loss is not high.

Upon observation of the surface condition of the magnetic recording layers of the respective mediums, it was found that with the mediums of the invention, the abrasive powders exhibited much improved dispersability because of the surface treatment with the specific type of isocyanate compound. Thus, the mediums of the invention had good smoothness on the surface of the magnetic recording layer. From this, it will be expected that the contamination of a magnetic head is reduced because the layer does rarely come off with a reduced degree of deterioration of electromagnetic conversion characteristics.

The relation between amount of each additive and wear loss of a magnetic head is shown in the sole FIGURE. From the FIGURE, it will be seen that the magnetic recording mediums of the invention show much better results than the mediums for comparison. In view of the wear loss tendency, the amount of the surface-treated abrasive powders should be not larger than 20 parts by weight per 100 parts by weight of the magnetic powder.

EXAMPLE 3

The general procedure of Example 1 was repeated using isocyanate compound Nos. (2) to (5) indicated before instead of Coronate L, thereby obtaining magnetic recording tapes. These tapes were subjected to the tests described before, with similar results as with Example 1.

What is claimed is:

1. A magnetic recording medium comprising a non-magnetic support, and a magnetic recording layer formed on said support, said magnetic recording layer being formed of a composition which comprises a magnetic powder and an abrasive powder dispersed in a resin binder, said abrasive powder having a coating of an isocyanate compound having at least two isocyanate groups in one molecule thereof and being used in an amount of from 0.5 to 20 parts by weight per 100 parts by weight of said magnetic powder.

2. A magnetic recording medium according to claim 1, wherein said abrasive powder is a metal oxide powder having an average size of from 0.2 to 1 μm.

3. A magnetic recording medium according to claim 2, wherein said metal oxide powder is chromium oxide powder.

4. A magnetic recording medium according to claim 1, wherein said isocyanate compound is a member selected from the group consisting of compounds of the following formulas (1) through (5)

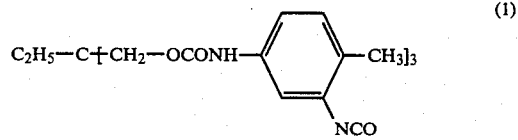

(1)

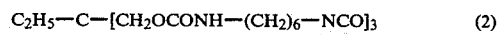

(2)

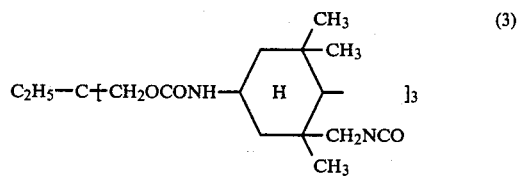

(3)

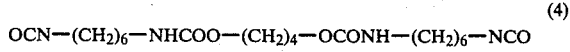

(4)

-continued
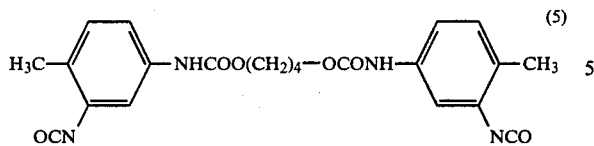
5. A magnetic recording medium according to claim 4, wherein said isocyanate compound is a compound of the following formula
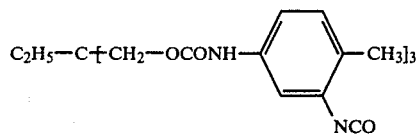
6. A magnetic recording medium according to claim 1, wherein said isocyanate compound is coated in an amount of from 3 to 20 wt% of said metal oxide powder.
* * * * *